(12) United States Patent  (10) Patent No.: US 8,639,940 B2
Lord et al.  (45) Date of Patent: Jan. 28, 2014

(54) METHODS AND SYSTEMS FOR ASSIGNING ROLES ON A TOKEN

(75) Inventors: Robert Lord, San Jose, CA (US); Steven W. Parkinson, San Jose, CA (US); Robert Relyea, Rohnert Park, CA (US)

(73) Assignee: Red Hat, Inc., Raleigh, NC (US)

( * ) Notice: Subject to any disclaimer, the term of this patent is extended or adjusted under 35 U.S.C. 154(b) by 1404 days.

(21) Appl. No.: 11/680,200

(22) Filed: Feb. 28, 2007

(65) Prior Publication Data

US 2008/0209225 A1    Aug. 28, 2008

(51) Int. Cl.
*G06F 21/00* (2013.01)
*G06F 11/30* (2006.01)
*G06F 12/14* (2006.01)
*G06F 7/04* (2006.01)
*G06F 12/00* (2006.01)
*G06F 13/00* (2006.01)
*G06F 17/30* (2006.01)
*H04L 9/32* (2006.01)
*H04L 29/06* (2006.01)
*H04L 9/00* (2006.01)

(52) U.S. Cl.
USPC ........... 713/185; 713/166; 713/169; 713/175; 380/277; 726/20

(58) Field of Classification Search
USPC ................. 713/166, 169, 175, 185; 380/277; 726/20
See application file for complete search history.

(56) References Cited

U.S. PATENT DOCUMENTS

| 4,108,367 | A |   | 8/1978  | Hannan |
|-----------|---|---|---------|--------|
| 4,849,614 | A | * | 7/1989  | Watanabe et al. ............. 235/379 |
| 4,924,330 | A |   | 5/1990  | Seamons et al. |
| 5,247,163 | A |   | 9/1993  | Ohno et al. |
| 5,355,414 | A |   | 10/1994 | Hale et al. |
| 5,499,371 | A |   | 3/1996  | Henninger et al. |
| 5,594,227 | A |   | 1/1997  | Deo |
| 5,631,961 | A |   | 5/1997  | Mills et al. |
| 5,666,415 | A |   | 9/1997  | Kaufman |
| 5,721,781 | A | * | 2/1998  | Deo et al. ......................... 705/67 |
| 5,745,576 | A |   | 4/1998  | Abraham et al. |
| 5,745,678 | A |   | 4/1998  | Herzberg et al. |
| 5,768,373 | A |   | 6/1998  | Lohstroh et al. |

(Continued)

FOREIGN PATENT DOCUMENTS

| WO | 9724831       | 7/1997 |
| WO | 0048064 A1    | 8/2000 |
| WO | 2007096590 A1 | 8/2007 |

OTHER PUBLICATIONS

ATM and Credit Card Notification, Feb. 2005 (internet archive) pp. 1-2 www.thereareplaces.com/infgdes/money.atmnotif.htm.

(Continued)

*Primary Examiner* — Edan Orgad
*Assistant Examiner* — Kari Schmidt
(74) *Attorney, Agent, or Firm* — Lowenstein Sandler LLP

(57) ABSTRACT

An embodiment relates generally to a method of assigning roles to a token. The method includes determining a first role for a first participant on a token and providing exclusive access to a first section of the token for the first participant base on the first role. The method also includes determining a second role for a second participant on the token and providing exclusive access to a second section of the token for the second participant based on the second role.

14 Claims, 8 Drawing Sheets

(56) References Cited

U.S. PATENT DOCUMENTS

| | | | |
|---|---|---|---|
| 5,862,310 A | 1/1999 | Crawford et al. | |
| 5,923,884 A | 7/1999 | Peyret et al. | |
| 5,937,066 A | 8/1999 | Gennaro et al. | |
| 5,943,423 A | 8/1999 | Muftic | |
| 5,991,411 A | 11/1999 | Kaufman et al. | |
| 5,991,882 A | 11/1999 | O'Connell | |
| 6,005,942 A * | 12/1999 | Chan et al. | 713/187 |
| 6,005,945 A | 12/1999 | Whitehouse | |
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1 | 4/2002 | Kennedy et al. | |
| 6,490,680 B1 * | 12/2002 | Scheidt et al. | 713/166 |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 * | 3/2006 | Prasad et al. | 709/225 |
| 7,050,589 B2 | 5/2006 | Kwan | |
| 7,051,213 B1 | 5/2006 | Kobayashi et al. | |
| 7,085,386 B2 * | 8/2006 | Audebert et al. | 380/281 |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,451,921 B2 | 11/2008 | Dowling et al. | |
| 7,469,837 B2 * | 12/2008 | Mizushima | 235/492 |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 * | 3/2009 | Snible et al. | 1/1 |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,860,243 B2 | 12/2010 | Zheng et al. | |
| 8,146,141 B1 * | 3/2012 | Grandcolas et al. | 726/5 |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 * | 6/2003 | Aull et al. | 713/156 |
| 2003/0115466 A1 * | 6/2003 | Aull et al. | 713/172 |
| 2003/0115467 A1 | 6/2003 | Aull et al. | |
| 2003/0115468 A1 * | 6/2003 | Aull et al. | 713/175 |
| 2003/0167399 A1 | 9/2003 | Audebert et al. | |
| 2003/0172034 A1 | 9/2003 | Schneck et al. | |
| 2003/0177392 A1 * | 9/2003 | Hiltgen | 713/201 |
| 2003/0204732 A1 * | 10/2003 | Audebert et al. | 713/182 |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 * | 5/2004 | Vassilev et al. | 713/200 |
| 2004/0096055 A1 | 5/2004 | Williams et al. | |
| 2004/0103324 A1 * | 5/2004 | Band | 713/202 |
| 2004/0103325 A1 * | 5/2004 | Priebatsch | 713/202 |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Constantino | |
| 2005/0033703 A1 | 2/2005 | Holdsworth | |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 * | 6/2005 | Freeman et al. | 380/277 |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 * | 4/2006 | Punaganti Venkata et al. | 455/412.1 |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0291664 A1 * | 12/2006 | Suarez et al. | 380/286 |
| 2006/0294583 A1 | 12/2006 | Cowburn et al. | |
| 2007/0014416 A1 | 1/2007 | Rivera et al. | |

(56) References Cited

U.S. PATENT DOCUMENTS

| | | |
|---|---|---|
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1* | 10/2007 | Youn ........................... 380/277 |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1* | 3/2008 | Arnold et al. ................. 713/169 |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

METHODS AND SYSTEMS FOR ASSIGNING ROLES ON A TOKEN

FIELD

This invention relates generally to managing tokens, more particularly, to methods and systems for assigning roles on the token.

DESCRIPTION OF THE RELATED ART

Smart cards are generally well known. Smart cards can be used to provide authentication for transactions such as logging into a secure computer. However, smart cards are not merely a piece of plastic with a strip of magnetic material. Smart cards also store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

The use of smart cards is a mechanism to increase security especially for large business and governmental entities. These entities often contain valuable information such as financial data, personnel records, strategies, etc., that may be critical for the respective entity. Moreover, smart cards can provide a method to control access to data within the enterprise systems of the respective entity. Accordingly, the reasons to use smart card ("tokens") are plentiful.

However, in some large business or governmental entities, multiple sub-organizations may want access and control of the tokens. The reason for the access and control can be related to the role of the sub-organization within the respective entity. For example, a human resource sub-organization may want access to the token to control the distribution of the token to valid employees while the sub-organization that hired the employee may want access to the token for its respective function. Both sub-organizations prefer not to have the other sub-organization to have access to their respective confidential information based on a shared token. Accordingly, there is a need for a method and/or system to be able to provide exclusive access to areas of the token based on roles.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
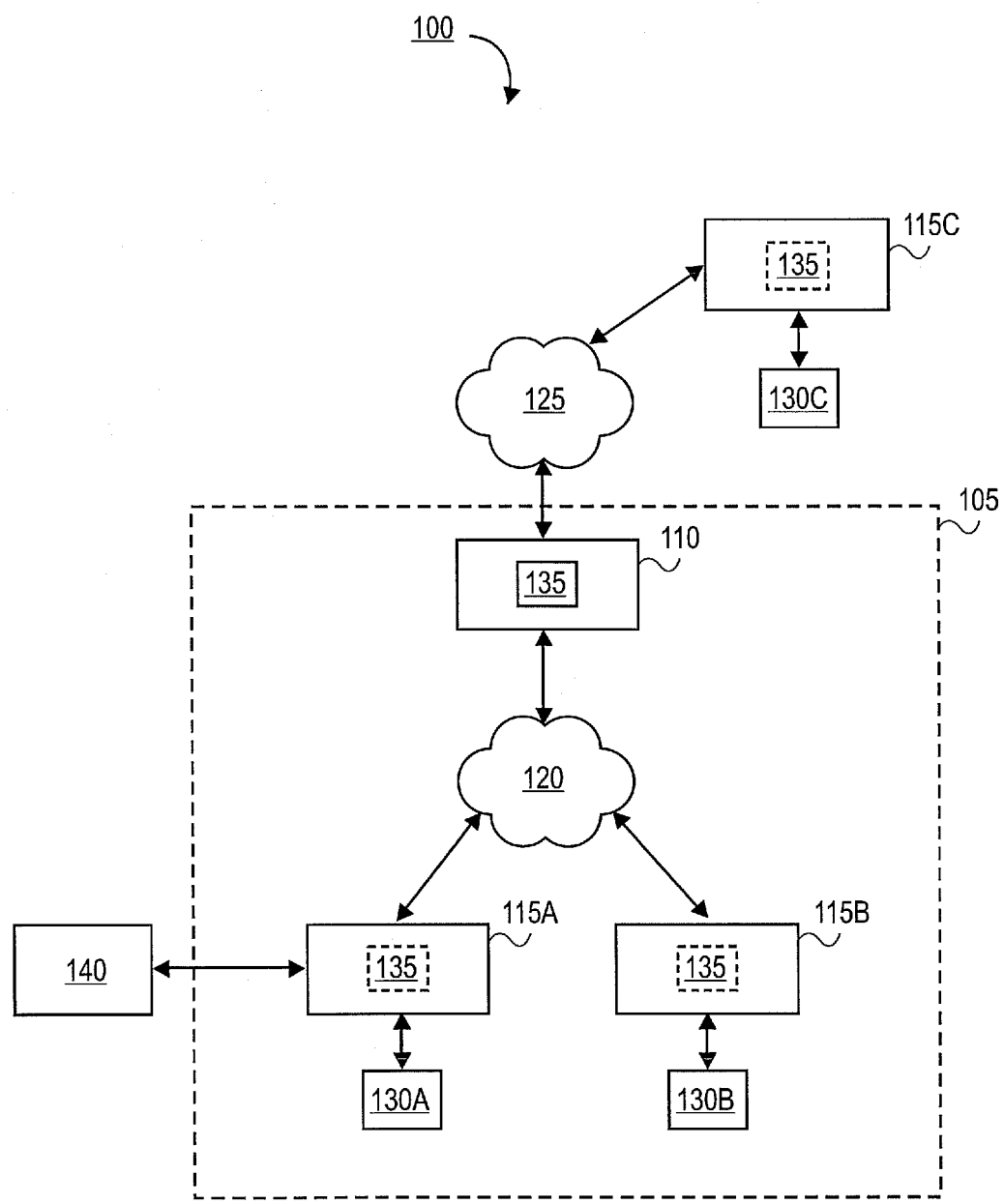
FIG. 1 illustrates an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computing applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, methods, and apparatus for providing role-based access to a smart card or token being shared by multiple groups, organizations, entities, etc. More particularly, a role assigner module can be configured to implement a role-assigning protocol to allow a smartcard (or token) to get from an initial state where the token can be managed by both the factory and a first recipient to a second state where the management of the token is split between two or more parties. Each party having exclusive access to their portion of the token with out the ability to access the other party's portion.

Embodiments use cryptographic keys as part of the protocol to move from the initial state to the above-described second state. More particularly, the cryptographic keys can be symmetric or asymmetric. Symmetric cryptographic keys can be derived using known key derivation algorithms that use encryption or hashing algorithms. These algorithms generally take public data and mixing it with a secret key. The mixing can be performed by: (1) hashing the derivation key material and the public data with a hash function (such as SHA-1 or MD-5); and (2) encrypting or decrypting public data with the derivation key and a block cipher (such as DES or AES), where the output (or a portion thereof) is the derived key.

Embodiments can also use multiple key sets. Multiple key sets (each with different purposes) can be derived from a single cryptographic key by varying the public data input. The public data input can be as simple as including a single byte which takes on the value (0, 1, 2, etc.) for $A_1$, $A_1$, $A_2$, etc., respectively. Accordingly, a key set based on a cryptographic key A can be derived from hashing A, 0, and a card identification number (CUID) together to arrive at $A_0$. The CUID can be regarded as a serial number that is embedded by the manufacturer. Similarly, $A_1$ can be derived from hashing A, 1, and the CUID together and so on for the rest of the set.

Embodiments can further use authentication as part of the role assigning protocol to move from the initial state to the second state. More specifically, authentication using symmetric cryptographic keys is based on two parties knowing a secret key. The secret key cannot be shared to any other third party. For the case where one party has to authenticate two different entities, each entity requires its own respective secret key.

Authentication can be generally accomplished by a challenge/response protocol, in which the response with the challenge is transformed by a key known to both parties. The authenticator can issue a random challenge to the authenticatee. The authenticatee "signs" the challenge using a cryptographic primitive called a message authentication code (MAC). The MAC can be generated by hashing algorithms, block ciphers, or other similar algorithms known to those skilled in the art. The MAC is then published back to the authenticator.

Embodiments of the present invention can also use asymmetric cryptographic keys. Asymmetric keys are different from symmetric keys in that asymmetric keys come in pairs. One of the keys is published, i.e., public and the second of the keys is kept private. Like symmetric keys, asymmetric keys can be used in signing/verification, encryption/decryption, and key derivation. Asymmetric keys can also be used to distribute or generate symmetric keys.

Accordingly, some embodiments use symmetric cryptographic keys to implement the role-assigning protocol. More particularly, a factory (or token manufacturer) and a first recipient can agree to share a cryptographic key A. The token manufacturer can embed or inject a first applet onto the token. The first applet can issue commands like "load new application", "new set of keys to use", "turn off a key set", "reset password", "erase smartcard", "lock the smartcard", "unlock the smartcard", etc.

The token manufacturer can also derive a symmetric key set $(A_0, A_1, \ldots A_N)$ based on cryptographic key A, public data and the CUID. The token manufacturer can then attach the symmetric key set $(A_0, A_1, \ldots A_N)$ to the first applet by using the command "new set of keys to use". Accordingly, first applet can now be accessed by a party (token manufacturer and first recipient) with access to cryptographic key A. Subsequently, the token with the first applet associated with the symmetric key set $(A_0, A_1, \ldots A_N)$ is forwarded to the first recipient.

In some embodiments, the first recipient can be an organization within a larger entity. For example, a human resource group in a corporation or a federal agency in the federal government. The first recipient can act a gatekeeper to grant access to the received token to other organizations within the entity. The other organizations would prefer not to grant access of their applets to the first recipient.

When the first recipient receives the token with the first applet associated with the symmetric key set $(A_0, A_1, \ldots A_N)$, the first recipient can initiate a key changeover to obtain exclusive the first applet can be configured to authenticate to the first applet. Since one of the keys in the symmetric key set $(A_0, A_1, \ldots A_N)$ is an authentication key and the first recipient share the cryptographic key A with the token manufacturer, the first recipient can generate a MAC with the authentication key, i.e., signs the challenge. The first applet validates the MAC and allows the first recipient access to the first applet.

Subsequently, the first recipient can use a symmetric cryptographic key B to derive a second set of symmetric keys $(B_0, B_1, \ldots B_N)$. The cryptographic key B is not shared and kept private by the first recipient. The first recipient can then load the second set of symmetric keys $(B_0, B_1, \ldots B_N)$ onto the token using its knowledge of cryptographic key A. The first recipient can use the first applet to issue commands to discontinue use of the symmetric key set $(A_0, A_1, \ldots A_N)$ and to use the second set of symmetric keys $(B_0, B_1, \ldots B_N)$. Accordingly, only users with access to the cryptographic key B can access the first applet.

The first recipient can embed additional applets for additional organizations. For the sake of clarity, the case of one additional applet for a second organization as a receiver entity is described. Accordingly, the first recipient and the receiver entity can share a symmetric cryptographic key C and derived a third symmetric key set $(C_0, C_1, \ldots C_N)$, where on the keys is an authentication key. The first recipient can authenticate to the first applet using the private cryptographic key B to sign the challenge from the first applet. The first recipient can invoke the first applet to load a second applet and the third symmetric key set $(C_0, C_1, \ldots C_N)$ once authenticated. The first recipient can use the second applet to associate the third symmetric key set $(C_0, C_1, \ldots C_N)$ with the second applet, i.e., issue a command to use new key set. Accordingly, the token now contains a first applet which is accessible only to the first recipient and a second applet which is accessible to the first recipient and the receiver entity. Subsequently, the token is forwarded to the receiver entity.

When the token is received, the receiver entity can perform a key changeover to obtain exclusive access over the second applet. More particularly, the receiver entity can authenticate to the received token using a MAC derived from the shared cryptographic key C. Once authenticated, the receiver entity can now access the second applet and discontinue the use of the third set of symmetric keys $(C_0, C_1, \ldots C_N)$ for the second applet. The receiver entity can derive a fourth set of symmetric keys $(D_0, D_1, \ldots D_N)$ based on a private symmetric cryptographic key D. The receiver entity can load the fourth set of symmetric keys $(D_0, D_1, \ldots D_N)$ onto the token and set this set of symmetric keys to the second applet. Accordingly, the receiver entity now has exclusive access to the second applet and cannot access the first applet. Similarly, the first recipient has exclusive access to the first applet an now cannot access the second applet. Thus, the protocol from switching to the from an initial state where the token can be managed by both the factory and a first recipient to a second state where the management of the token is split between two or more parties for symmetric keys is described according to some embodiments.

The role-assigning protocol can also be implemented using asymmetric keys. More particularly, the first recipient can send its public key B to the token manufacturer. The token manufacturer loads the first applet associated with the public key B of the first recipient and forward the embedded token to the first recipient.

The first recipient authenticates to the token using a MAC that uses the private key pair of public key B. Once authenticated, the first recipient can insert a second applet associated with a public key D, which was forwarded to the first recipient by the receiver entity. The token can then be forwarded to the receiver entity.

The receiver entity can now authenticate to the second applet using a MAC that uses the private key pair of public key D and access the second applet. The receiver entity does not have access to the first applet because it is associated with the public key of B. Similarly, the first recipient has exclusive access to the first applet and cannot access the second applet because it is associated with the pubic key of D.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise an entity 105. The entity 105 can be the information infrastructure for a government agency, a business entity, an educational entity or combination thereof. The entity can be further comprised of a security server 110 and clients 115a-c. The security server 110 can interface with clients 115ab through a local network 120 to provide a communication channel between the security server 110 and the clients 115ab. The local network 120 can be implemented using local area protocols such as Ethernet, token ring or other similar protocols known to those skilled in the art. Moreover, the local network 120 can be a wired network, a wireless network or combination thereof.

The security server 110 can also interface with a remote client 115c over an external network 125 such as the Internet. The external network 125 can also be a virtual private network implemented over the Internet for security reasons in some embodiments.

The clients 115a-c can be a computing machine or platform configured to execute secure and open applications through a multi-user operating system. The clients 115a-c can be implemented with personal computers, workstations, thin clients, thick clients, or other similar computing platforms as known to those skilled in the art. The clients 115a-c can operate using operating systems such as Linux, Windows, Macintosh or other available multi-tasking operating systems.

Each client 115 can be configured to interface with a respective security device 130. The security device 130a-c can be configured to act as a gatekeeper for the respective client 115a-c. More particularly, a user can use a security token, such as a smart card, to access the respective client 115a-c as well as each client 115a-c to manage an inserted token.

Each client 115a-c can also represent an internal organization, division, and/or sub-organization of the entity 105. For example, client 115a can represent a human resource organization and client 115b can represent an accounting organization. As another example, remote client 115c can represent another internal organization or a third party entity in a relationship with entity 105.

Notwithstanding the embodiments of the client and security server of system 100 can be implemented in a variety of methods without departing from the scope of the claims. For example, a client could be a wireless device such as Blackberry™, where a wearable token provides access to the wireless device via Bluetooth™ interface or the smartcard can be connected with a contactless interface such as an radio frequency identification reader.

The system 100 can further comprise a token manufacturer 140. The token manufacturer 140 can produce tokens for the entity 105 and interface with one of the sub-organizations (e.g., security, human resources, IT, etc.) to manage the exchange of the tokens. The token manufacturer 140 can produce a token as depicted in FIG. 2.

Figure 2:
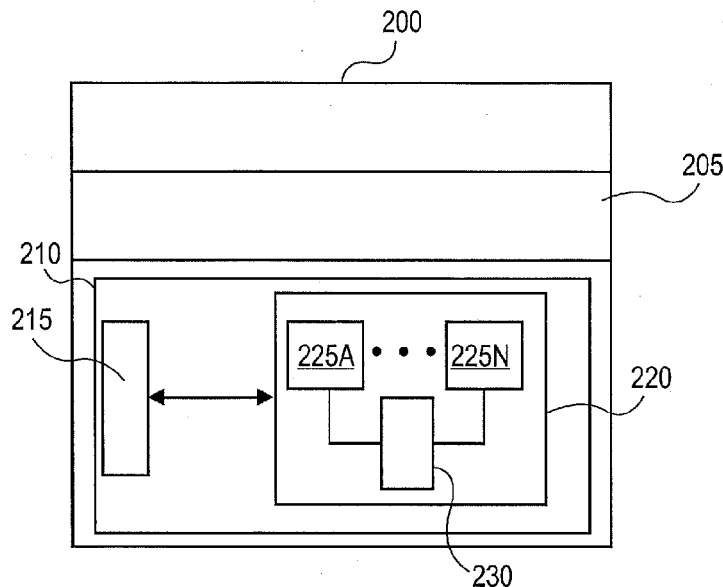
FIG. 2 illustrates an exemplary token in accordance with another embodiment.

FIG. 2 illustrates an exemplary token 200 in accordance with another embodiment. It should be readily apparent to those of ordinary skill in the art that the token 200 depicted in FIG. 2 represents a generalized schematic illustration and that other components may be added or existing components may be removed or modified.

As shown in FIG. 2, the token 200 can comprise a magnetic strip 205 and a circuit 210. The magnetic strip 205 can be encoded with information for a user to access a client 115 as determined by an issuing security entity. The circuit 210 can be configured, among other things, to provide data storage for applets, storage of keys, and information. In some embodiments, the circuit 210 can include a card identification module 215. The card identification module 215 can be configured to store the card identification number of the token. This card identification number is a unique number which identifies the token and is often referred as a "CUID". The circuit 210 can also include a storage area or space 220 for applets, such as applets 225A-225N. This area can be allocated based on roles of the different entities. The number of applets can be injected onto the card depending on the space on the circuit 210. However, the first applet (e.g., applet 225A) injected on the circuit 210 can be configured to allow the injection of the rest of the applets. The first applet 225A can be referred to as a manager applet, which can then be configured to manage the token. The other applets 225B-225N can have a variety of functions. Electronic wallets, secure log-on to a web server, decrypting electronic mail are a few examples of applets that can be stored within the token. The applets 225A-225N can also issue commands such as "load new application", "new set of keys to use", "turn off a key set", "reset password", "erase smartcard", "lock the smartcard", "unlock the smartcard", etc. The applets 225A-225N can communicate with the security device 130 (thus, the clients) using Application Protocol Data Unit ("APDU") packets under the ISO 7816 standard and related standards.

The circuit 210 can also be configured to with a key storage area 230. The key storage area 230 can be a buffer which stores cryptographic keys. The cryptographic keys can be a single or a set of cryptographic keys. Each key or set of keys can be attached or associated with a respective applet. For example, key storage area 230 can store derived cryptographic keys or sets of cryptographic keys based on respective cryptographic keys A and B and the CUID. Accordingly, a user with access to cryptographic key A can access the first applet 225A while being barred from the second applet 225B. Similarly, a user with the access to cryptographic key B can access the second applet 225B while being barred from the first applet 225A.

Returning to FIG. 1, in some embodiments, the security server 110 can store and execute a role assigner module 135. In other embodiments, the role assigner module 135 can be executed by the client 115a-c locally. The role assigner module 135 can be configured to perform key-changeovers to permit a client 115 to grant exclusive access to a respective section of a token as part of the role-assigning protocol. As an example, a human resource entity, as a first participant or granter, may want access to a token to manage the distribution of the token to the correct user. A second entity (e.g., accounting, finance, information technology, etc.) may want access to the same token to allow the user to access the confidential information of the second entity. The conventional solution is to allow insert keys for both entities on the token. However, this potentially can permit unauthorized access to either system if the token is compromised. Accordingly, the role assigner module 135 can be invoked to assign an applet based on the role of a participant, as depicted in FIGS. 3A-3D.

FIGS. 3A-3D collectively illustrate an exemplary process flow for the system 100 (shown in FIG. 1) and the token 200 (shown in FIG. 2) in accordance with yet another embodiment. It should be readily apparent to those of ordinary skill in the art that the process flow collectively depicted in FIGS. 3A-3D represents a generalized schematic illustration and that other steps may be added or existing steps may be removed or modified.

Figure 3A:
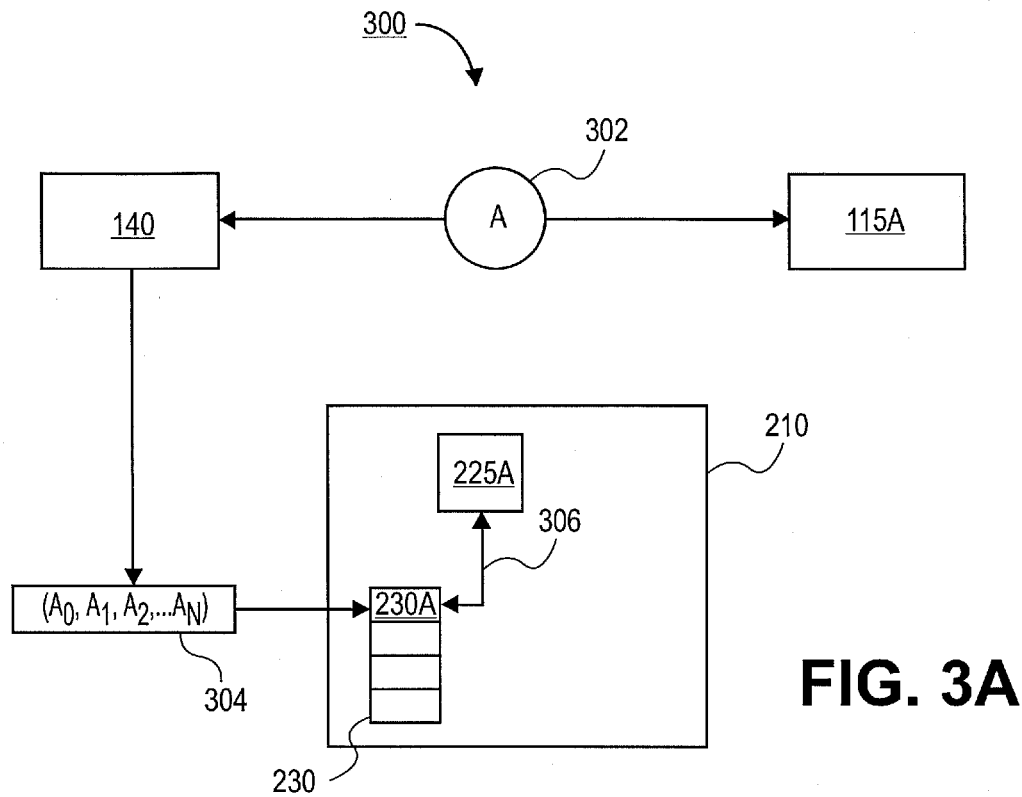
FIGS. 3A-3F each illustrates an exemplary scenario in accordance with yet another embodiment.

FIG. 3A, more specifically, depicts a scenario 300 in accordance with yet another embodiment. One of the premises of the scenario 300 is that pairs of parties share a symmetric cryptographic key. For example token manufacturer 140 and client 115A can share a symmetric cryptographic key. Client 115A and client 115B can also share a different symmetric cryptographic key.

As shown in FIG. 3A, a token manufacturer 140 can share a symmetric cryptographic key A 302 with client 115A. Client 115A can be organization within an entity, for example a human resources department in a corporation or a federal agency within the federal government. Client 115A can then be referred as a granter entity 115A. The token manufacturer 140 can insert a first applet 225A onto circuit 210 of the token 200 (see FIG. 2). The first applet 225A can have a variety of functions. However, the first applet 225A can issue commands like "load new application", "new set of keys to use", "turn off a key set", "reset password", "erase smartcard", "lock the smartcard", "unlock the smartcard", etc, along with other predetermined functionality.

The token manufacturer 140 can generate a first set of symmetric keys $(A_0, A_1, \ldots A_N)$ 304 based on the symmetric cryptographic key A, an input value, and the CUID stored on the card identification module 215. For the sets of symmetric keys being described, each key within the set can be derived from hashing a cryptographic key, an input data value, and the CUID. The variants within the key set can be based on varying the input data value.

The first set of symmetric keys $(A_0, A_1, \ldots A_N)$ 304 can then be stored in the key storage area 230 such as buffer space 230A. The token manufacturer 140 can then attach or associate the first set of symmetric keys $(A_0, A_1, \ldots A_N)$ 304 to the first applet 225A as indicated by line 306. More particularly, the token manufacturer 140 can issue a command from the first applet 225A to use the first set of symmetric keys $(A_0, A_1, \ldots A_N)$ 304.

The token manufacturer 140 can then forward the token 200 embedded with the first applet 225A to the granter entity 115A. Accordingly, at this point in time, the token manufacturer 140 and the granter entity 115 have access to the first applet 225A based on both entities sharing the symmetric cryptographic key A 302.

Figure 3B:
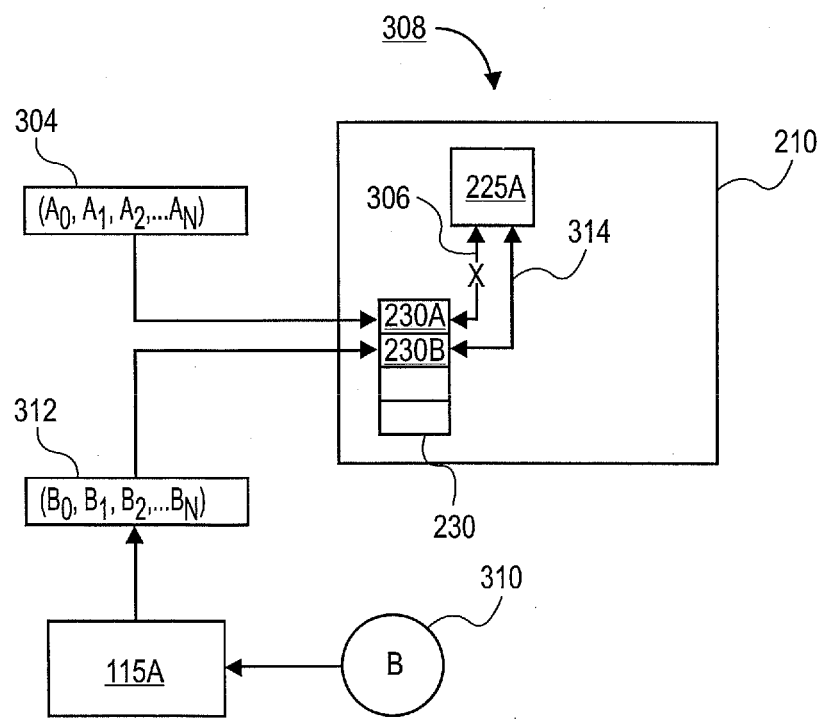

FIG. 3B depicts a scenario 308 of the granter entity 115A performing a key changeover to obtain exclusive access of the first applet. More particularly, in the current state of the token 200, the token manufacturer 140 still has access to the first applet 225A because the attached set of symmetric keys $(A_0, A_1, \ldots A_N)$ 304 is associated with the token manufacturer 140 and granter entity 115A and both entities share the symmetric cryptographic key A 302. Thus, one of the goals of the key changeover is to obtain exclusive control of the first applet 225A by the granter entity 115A.

As shown in FIG. 3B, the granter entity 115A can be configured to authenticate to the first applet 225A by signing a MAC that uses the cryptographic key A to a challenge from the first applet. The granter entity 115A can be configured to generate a second set of symmetric keys $(B_0, B_1, \ldots B_N)$ 312 based on a symmetric cryptographic key B 310 once authenticated. Similar to cryptographic key A 302, the cryptographic key B 310 can be a symmetric cryptographic key generated by respective cryptographic algorithms as known to those skilled in the art. The cryptographic key B 310 is held privately by the granter entity 115A and is not shared with other entities. The second set of symmetric keys $(B_0, B_1, \ldots B_N)$ 312 is generated based on hashing the cryptographic key B 310, a varying input data value, and the CUID stored in the card identification module 215 (shown in FIG. 2) as known to those skilled in the art.

The granter entity 115A can then store the second set of symmetric keys $(B_0, B_1, \ldots B_N)$ 308 in the key storage area 230, e.g., in buffer space 230B. Subsequently, the granter entity 115A can be configured to sever the association between the first set of symmetric keys $(A_0, A_1, \ldots A_N)$ 304, i.e., issue a command to discontinue the use of the first set of symmetric keys $(A_0, A_1, \ldots A_N)$ 304, and the first applet 225A 312 as indicated in line 306 and attach or associate the second set of keys $(B_0, B_1, \ldots B_N)$ 308 with the first applet 225A as indicated by line 314, i.e., issue a command to use the new key set. Accordingly, granter entity 115A currently has exclusive access and control over the first applet 225A. The granter entity 115A can also be configured to delete the first set of symmetric keys $(A_0, A_1, \ldots A_N)$ 304 from the key storage area 230 in some embodiments.

Figure 3C:
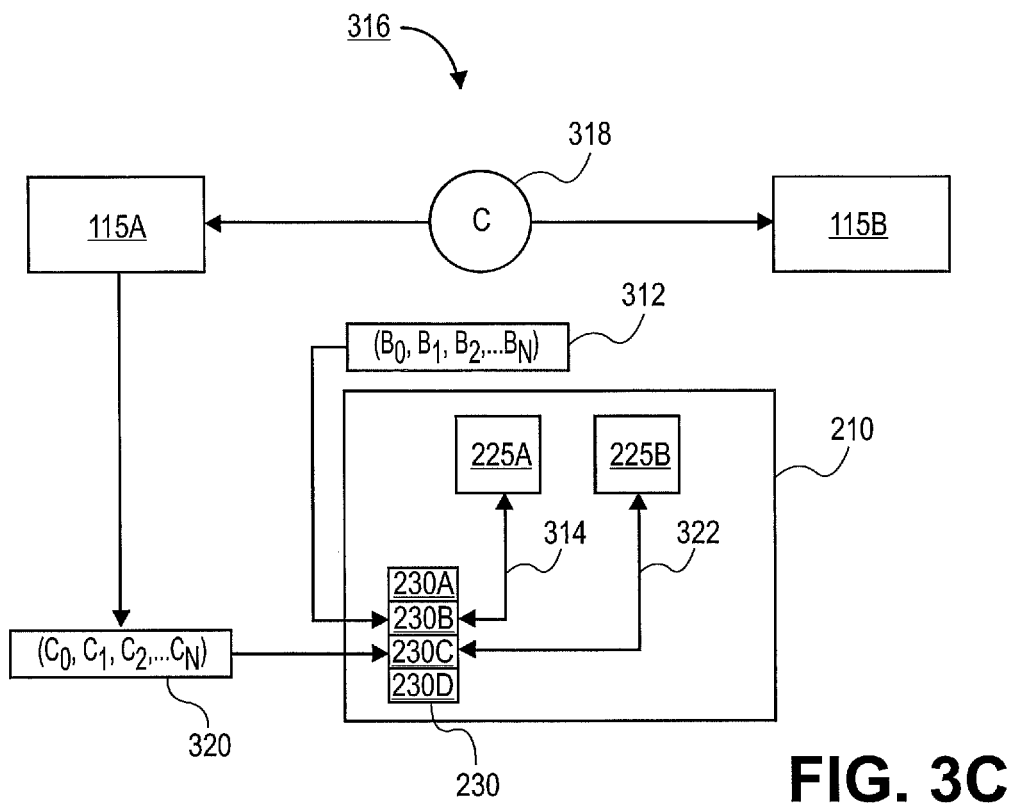

FIG. 3C depicts a scenario 316 where granter entity 115A embeds a second applet 225B for client 115B or a receiver entity 115B. This scenario 316 is premised on that the granter entity 115A and the receiver entity 115B share a symmetric cryptographic key C 318. The cryptographic key C 318 can be a symmetric generated by symmetric cryptographic algorithms as known to those skilled in the art.

The current state of the token is that first applet 225A is exclusively controlled by the granter entity 115A by virtue of being attached to the second set of keys $(B_0, B_1, \ldots B_N)$ 308 as indicated by line 314. The granter entity 115A can authenticate to the first applet 225A by signing a challenge from the first applet 225A with a MAC that uses the cryptographic key B. The granter entity 115A can insert a second applet 225B on the circuit 210 once authenticated by issuing a command to add new applet. The second applet 225B can be a variety of applications such as an electronic wallet, secure Web log-on, etc.

The granter entity 115A can then be configured to generate a third set of symmetric keys $(C_0, C_1, \ldots C_N)$ 320 based on the symmetric cryptographic key C 318, where the cryptographic key C 318 is shared between granter entity 115A and the receiver entity 115B. More particularly, the granter entity 115A can generate the third set of symmetric keys $(C_0, C_1, \ldots C_N)$ 320 based on hashing the symmetric cryptographic key C 318, varying an input value, and the CUID stored in the card identification module 215.

The granter entity 115A can then be configured to associate or attach the third set of symmetric keys $(C_0, C_1, \ldots C_N)$ 320 with the second applet 225A as indicated by line 322 by issuing a command to the second applet 225B to use the third set of symmetric keys $(C_0, C_1, \ldots C_N)$ 320. As a result, the second applet 225B has been injected on the card and be accessed by the granter entity 115A and the receiver entity 115B. Subsequently, the granter entity 115A can forward the token 200 to the receiver entity 115B.

Figure 3D:
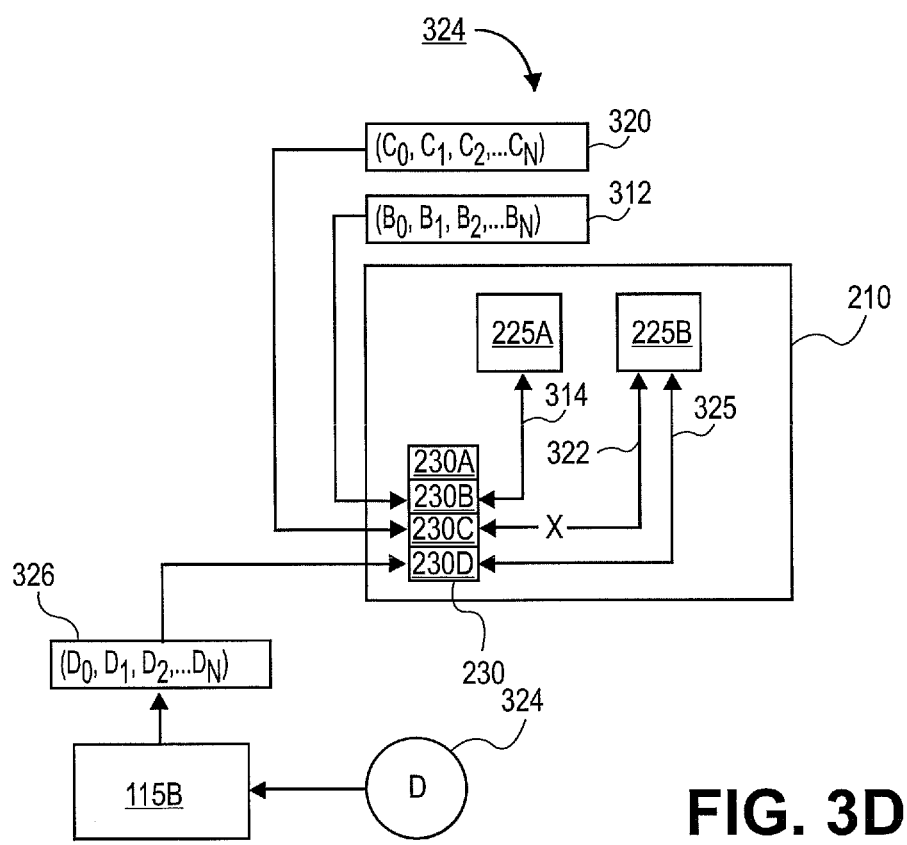

FIG. 3D depicts a scenario 324 where the receiver entity 115B performs a key changeover to obtain exclusive control of the second applet 225B. More particularly, in the current state of the token 200, the granter entity 115A still has access to the second applet 225B because the attached third set of symmetric keys $(C_0, C_1, \ldots C_N)$ 320 is associated with the granter entity 115A as indicated by line 322 and the receiver entity 115B and both entities share the symmetric cryptographic key C 318. Thus, one of the goals of this key changeover is to obtain exclusive control of the second applet 225B by the receiver entity 115B.

As shown in FIG. 3D, the receiver entity 115B can be configured to authenticate to the second applet 225A by signing a MAC with derived key from the cryptographic key C.

The receiver entity 115B can issue a command to the second applet 225B to discontinue use of the third set of symmetric keys ($C_0, C_1, \ldots C_N$) 320.

The receiver entity 115B can then be configured to generate a fourth set of symmetric keys ($D_0, D_1, \ldots D_N$) 326 based on a symmetric cryptographic key D 324 similar to the other sets of symmetric keys previously described. The cryptographic key D 324 is held privately by the receiver entity 115B and is not shared with any other entities. Similar to the other cryptographic keys A, B, or C, the cryptographic key D 324 can be a symmetric key generated by cryptographic algorithms known to those skilled in the art.

The receiver entity 115B can then store the fourth set of keys ($D_0, D_1, \ldots D_N$) 326 in the key storage area 230, e.g., in buffer space 230D. The receiver entity 115B can attach or associate the fourth set of symmetric keys ($D_0, D_1, \ldots D_N$) 326 with the second applet 225B as indicated by line 328 by issuing a command to the second applet 225B to use the newest key set. Accordingly, receiver entity 115B now has exclusive access and control over the second applet 225B. Moreover, the receiver entity 115B cannot access first applet 225A and the granter entity 115A cannot access the second applet 225A. Thus, roles have been assigned on a token based on the functions of various parties.

Figure 3E:
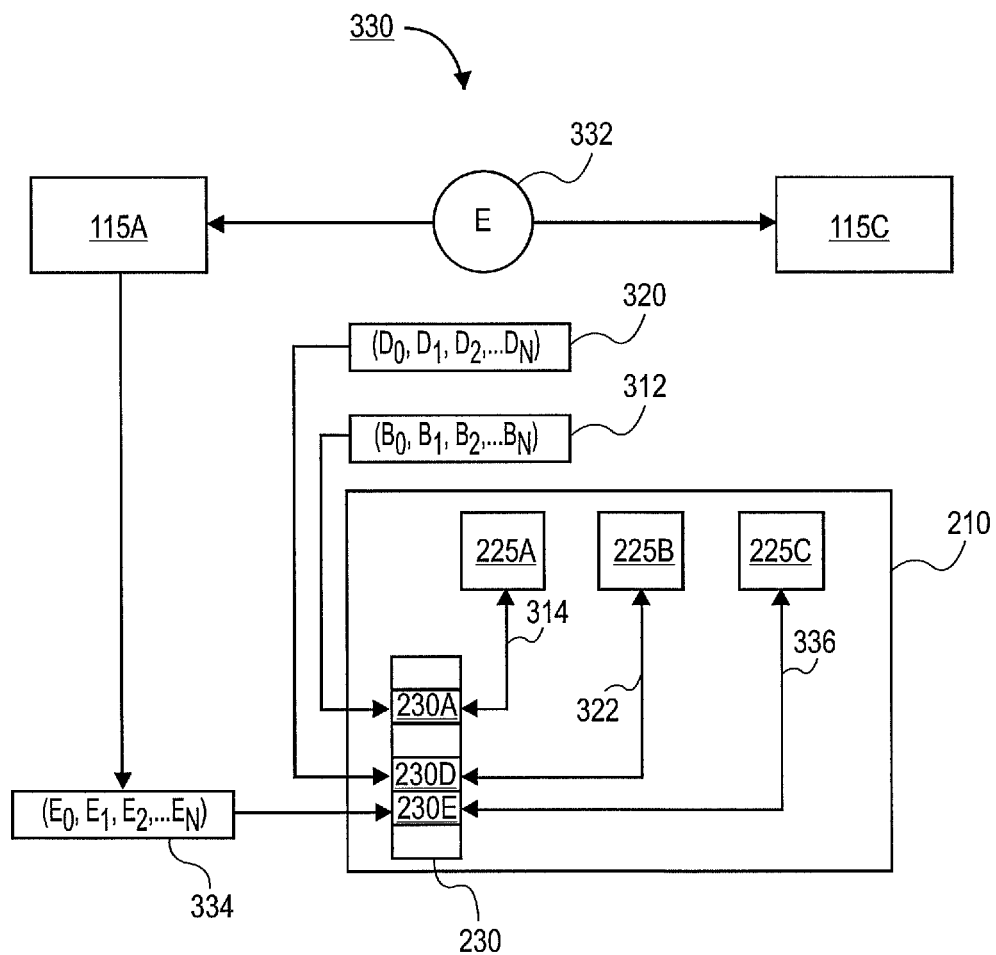

FIG. 3E depicts a scenario 330 where granter entity 115A embeds a third applet 225C for a client 115C or a second receiver entity 115C. This scenario 330 is premised that granter entity 115A and the second receiver entity 115C share an cryptographic key E 332. The cryptographic key E 332 can be a symmetric or asymmetric key generated by respective symmetric and asymmetric encryption algorithms as known to those skilled in the art.

The current state of the token is that first applet 225A is exclusively controlled by the granter entity 115A by virtue of first applet 225A being attached to the second set of keys ($B_0, B_1, \ldots B_N$) 312 as indicated by line 314. Further, the receiver entity 115A has exclusive control over the second applet 225B by virtue of being attached to the fourth set of keys ($D_0, D_1, \ldots D_N$) 320 as indicated by line 322. The granter entity 115A can insert a third applet 225C on the circuit 210 by operation of the first applet 225A once authenticated. The third applet 225C like the second applet 225B can be a variety of applications such as an electronic wallet, secure Web log-on, etc.

The granter entity 115A can be configured to generate a fifth set of symmetric cryptographic keys ($E_0, E_1, \ldots E_N$) 334 based on a symmetric cryptographic key E 332, where the cryptographic key E 326 is shared between granter entity 115A and the second receiver entity 115C. More particularly, the granter entity 115A can generate the fifth set of symmetric keys ($E_0, E_1, \ldots E_N$) 334 like the other key sets previously described. The granter entity can be configured to store the fifth set of keys ($E_0, E_1, \ldots E_N$) 334 in the key storage area 230 such as buffer space 230E.

The granter entity 115A can then be configured to associate or attach the fifth set of symmetric keys ($E_0, E_1, \ldots E_N$) 334 to the third applet 225C as indicated by line 336. As a result, the third applet 225A has been injected on the token 200 and be accessed by the granter entity 115A and the second receiver entity 115B. Subsequently, the granter entity 115A can forward the token 200 to the second receiver entity 115A. The second receiver entity 115C can perform a key changeover similar to the key changeover depicted in FIG. 3D to obtain exclusive control over the third applet 225C.

Figure 3F:
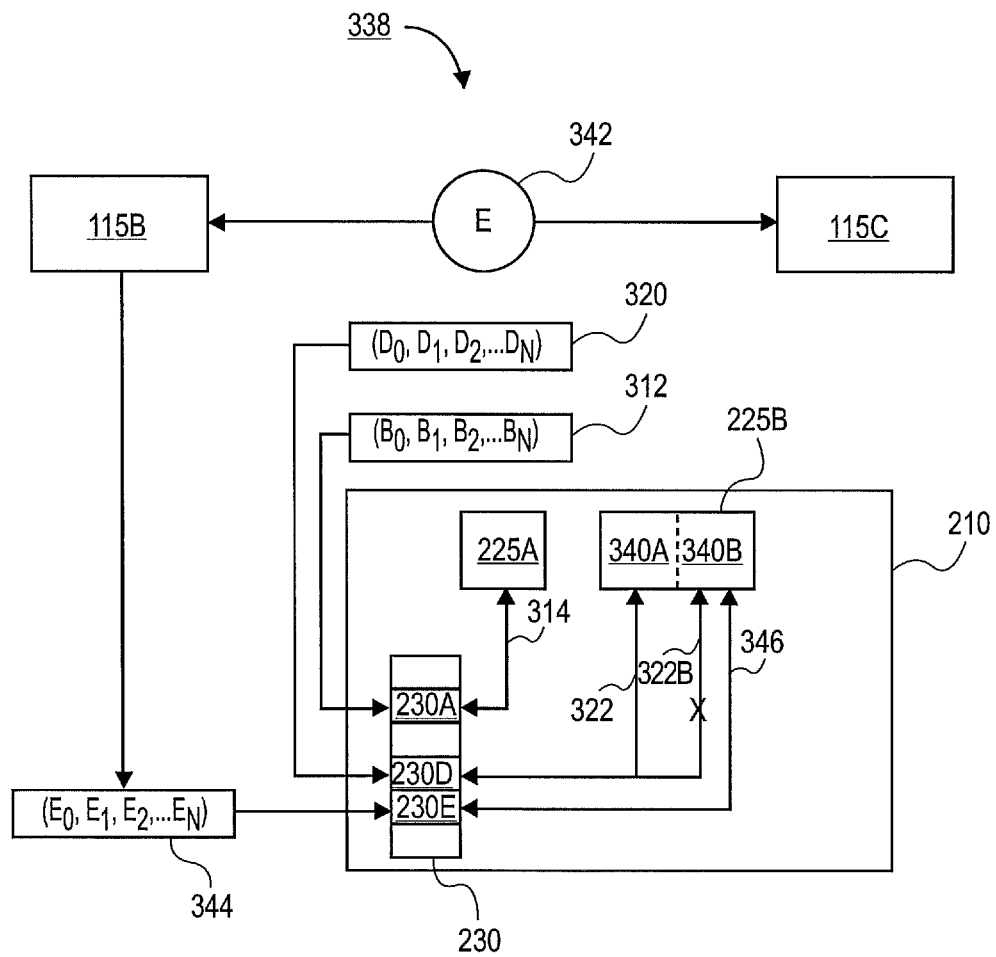

FIG. 3F depicts a scenario 338 where an applet 225 can subdivide. More particularly, the current state of the token is that first applet 225A is exclusively controlled by the granter entity 115A by virtue of being attached to the second set of keys ($B_0, B_1, \ldots B_N$) 312 as indicated by line 314. Further, the receiver entity 115A has exclusive control over the second applet 225B by virtue of being attached to the fourth set of keys ($D_0, D_1, \ldots D_N$) 320 as indicated by line 322.

One aspect of the space occupied by an applet is that it can be shared. As shown in FIG. 3F, applet 225B can subdivide into partitions 340A, 340B. However, this subdivision can only be done by the receiver entity 115B since it has exclusive control of the second applet 225B. After the subdivision, each partition (340A and 340B) are initially attached to the fourth set of symmetric keys ($D_0, D_1, \ldots D_N$) 320. Similarly, granter entity 115A could subdivide applet 225A by virtue of being attached to the second set of symmetric keys ($B_0, B_1, \ldots B_N$) 312.

One of the premises of scenario 338 is that the receiver entity 115B and the second receiver entity 115C share an cryptographic key E 342. The cryptographic key E 342, similar to cryptographic keys A-D, can be a symmetric or an asymmetric key known to those skilled in the art.

The receiver entity 115B can then generate a fifth set of keys ($E_0, E_1, \ldots E_N$) 344 based on cryptographic key E 342, which is shared by receiver entity 115B and a second receiver entity 115C. Since the cryptographic key E can be symmetric or asymmetric, it follows the fifth set of keys ($E_0, E_1, \ldots E_N$) 344 can also be symmetric or asymmetric depending on the state of the cryptographic key E 342. The fifth set of keys ($E_0, E_1, \ldots E_N$) 344 can be stored in the key storage area 230 such as buffer space 230E. The receiver entity 115B can be configured to sever the attachment of the fourth set of symmetric keys ($D_0, D_1, \ldots D_N$) 320 for partition 340B as indicated by line 322B and attach or associate the fifth set of symmetric keys ($E_0, E_1, \ldots E_N$) 342 with the partition 332B as indicated by line 346. The second receiver entity 115C can perform a key changeover similar to the key changeover depicted in FIG. 3D to obtain exclusive control over the partition 340B.

Although it appears from the previously described scenarios that the cryptographic key sets can be used to control access to the applets, the cryptographic key sets can also be used to control access control lists, data, and other components on the token.

Figure 3G:
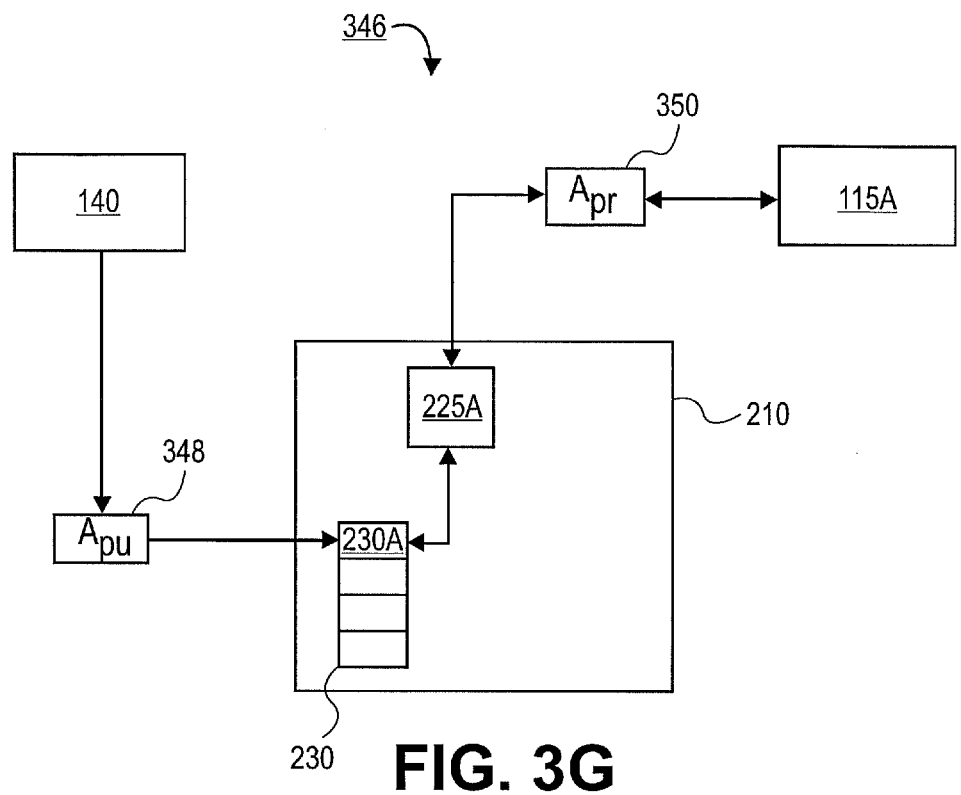

FIG. 3G depicts a scenario 346 using asymmetric keys. As previously described, asymmetric keys come in a pairs: a private key ($K_{pr}$) and a public key ($K_{pu}$). The private key ($K_{pr}$) is held private by the owner. The public key ($K_{pu}$) is published and typically held by third party. Users wishing to communicate the owner of the public key ($K_{pu}$) can obtain the public key ($K_{pu}$) from a third party. The user can then encrypt any information with the public key ($K_{pu}$), which is subsequently sent to the owner. The owner can then use the private key ($K_{pr}$) to retrieve the sent information.

Accordingly, as shown in FIG. 3G, the token manufacturer 140 can be configured to insert applet 225A onto the circuit 210. The token manufacturer 140 can retrieve a public key $A_{pu}$ 348 of the granter entity 115A and store the public key $A_{pu}$ 348 in a buffer space 230A of the key storage area 230. The token manufacturer 140 can then issue a command for the first applet 225A to use the public key $A_{pu}$ 348. Subsequently, the token manufacturer 140 can forward the embedded token to the granter entity 115A.

The granter entity 115A can now exclusively access the first applet 225A because the granter entity 115A secretly holds the complementary key of the public key $A_{pu}$ 348, which is private key $A_{pr}$ 350. The token manufacturer 140 is barred from accessing the first applet 225A because it does not have access to the private key $A_{pr}$ 350.

Figure 3H:
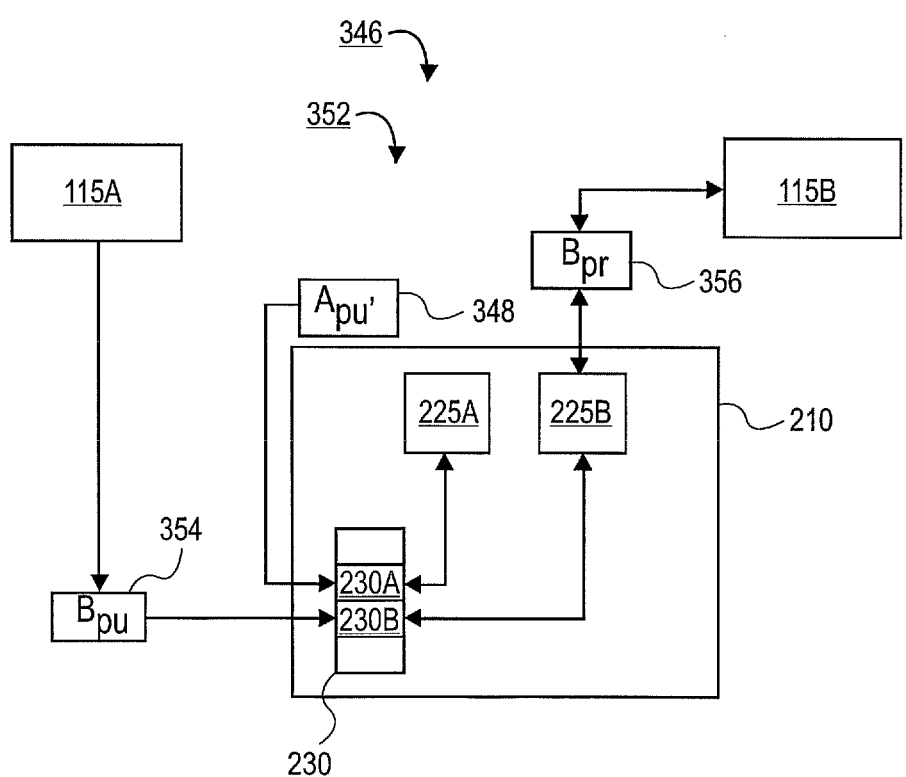

FIG. 3H illustrates a scenario 352 of the granter entity 115A inserting a second applet 225B for receiver entity 115B using asymmetric keys. As shown in FIG. 3H, the first applet 225A is attached with the public key $A_{pu}$. The granter entity 115A can be configured to insert or inject the second applet 225B on the circuit 210. The granter entity 115A can then retrieve a public key $B_{pu}$ 354 of the receiver entity 115B and store the public key $B_{pu}$ 354 in buffer space 230B of the key storage area 230. The granter entity 115A can issue a command from the second applet to use the public key $B_{pu}$ 354. Subsequently, the embedded token can be forwarded to the receiver entity 115B.

When the embedded token is received, the receiver entity 115B has exclusive control over applet 225B. More particularly, since the receiver entity 115B secretly holds the private key $B_{pr}$ 356, it can authenticate to the second applet 225B by signing with a MAC that uses the private key $B_{pr}$ 356 and gain access to the second applet 225B. The token manufacturer 140 and the granter entity 115 can only access the public key $B_{pu}$ 354, and thus are barred from accessing the second applet 225B.

Figure 4:
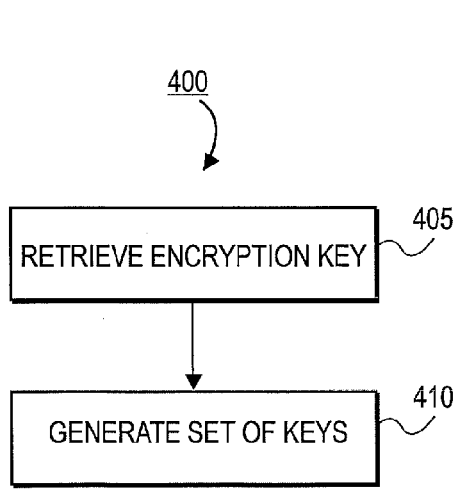
FIG. 4 illustrates an exemplary flow diagram in accordance with yet another embodiment.

FIG. 4 illustrates an exemplary flow diagram 400 executed by the role assigner module 135 in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the role assigner module 135 can be configured to retrieve an cryptographic key, in step 405. The retrieved cryptographic key can be private key or a shared key. The retrieved cryptographic key can also be asymmetric or symmetric as known to those skilled in the art. The role assigner module 135 can then be configured to generate a set of keys based on the cryptographic key and the CUID of a token, in step 410.

Figure 5:
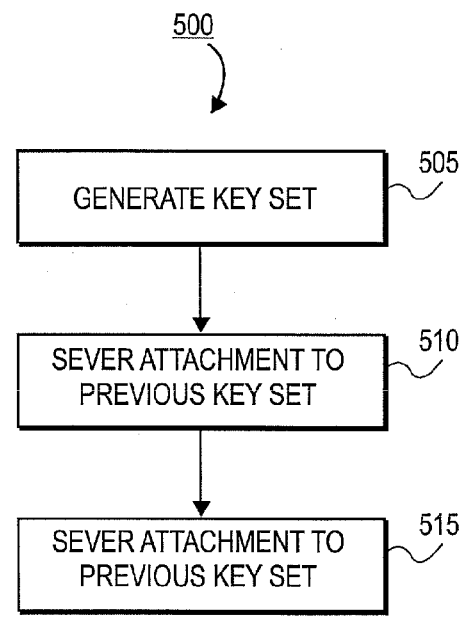
FIG. 5 illustrates another exemplary flow diagram in accordance with yet another embodiment.

FIG. 5 illustrates an exemplary flow diagram 500 executed by the role assigner module 135 in accordance with yet another embodiment. t should be readily apparent to those of ordinary skill in the art that the flow diagram 500 depicted in FIG. 5 represents a generalized schematic illustration and that other steps may be added or existing steps may be removed or modified.

As shown in FIG. 5, the role assigner module 135 can be configured to secure a new set of keys in step 505. More particularly, the role assigner module 135 can execute the flow diagram shown in FIG. 4 to obtain the set of keys and store the set of keys in the key storage space 230.

In step 510, the role assigner module 135 can be configured to sever the attachment between the current applet and a previous set of keys.

In step 515, the role assigner module 135 can be configured to attach or associate the new set of keys with the current applet.

Figure 6:
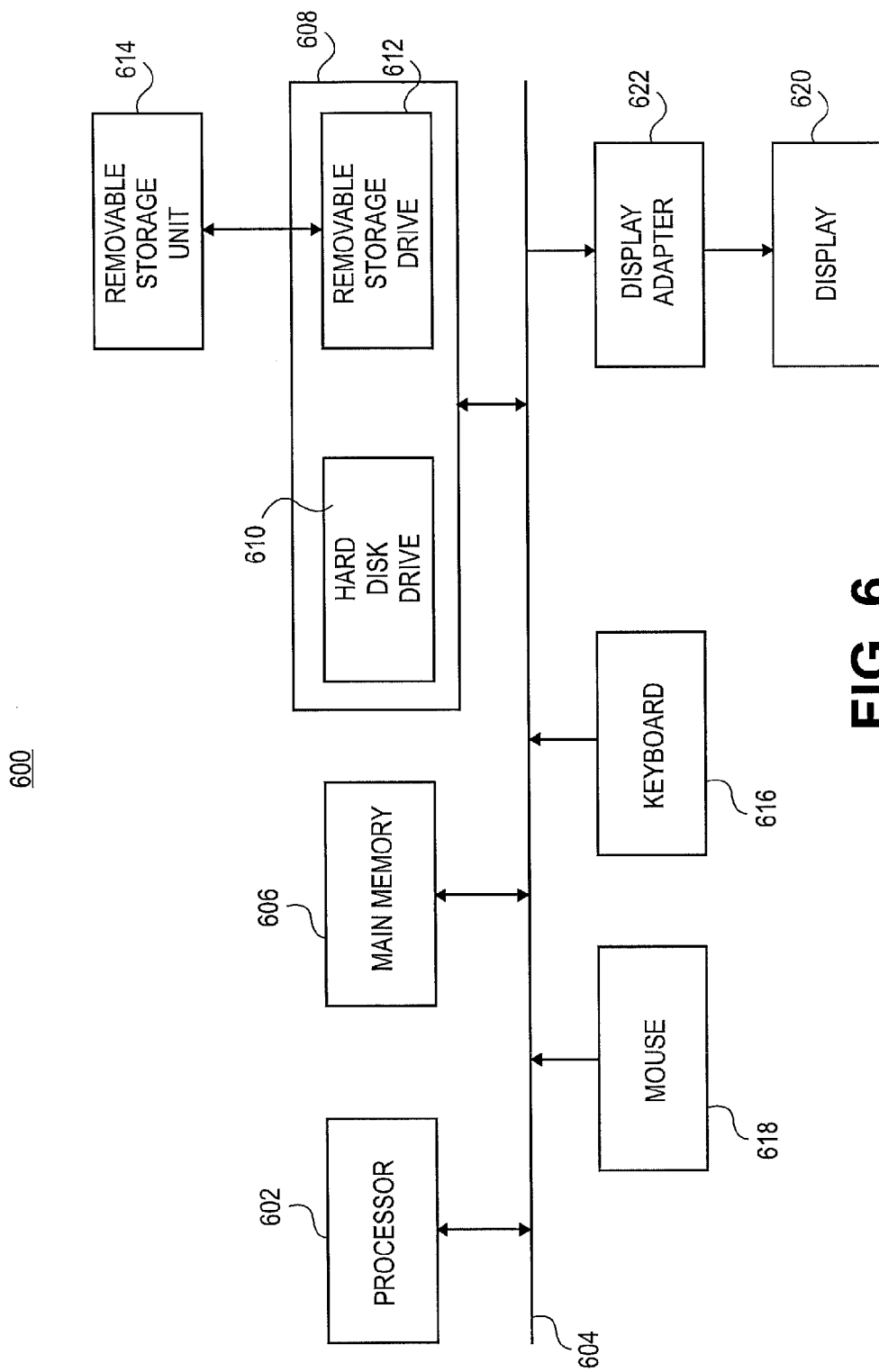
FIG. 6 illustrates an exemplary computing platform to execute embodiments of the present teachings.

FIG. 6 illustrates an exemplary block diagram of a computing platform 600 where an embodiment may be practiced. The functions of the role assigner module 135 can be implemented in program code and executed by the computing platform 600. The role assigner module can be implemented in computer languages such as PASCAL, C, C++, JAVA, etc.

As shown in FIG. 6, the computer system 600 includes one or more processors, such as processor 602 that provide an execution platform for embodiments of the role assigner module. Commands and data from the processor 602 are communicated over a communication bus 604. The computer system 600 also includes a main memory 606, such as a Random Access Memory (RAM), where the role assigner module can be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the role assigner module can be stored. The removable storage drive 612 reads from and/or writes to a removable storage unit 614 in a well-known manner. A user interfaces with the role assigner module with a keyboard 616, a mouse 618, and a display 620. A display adapter 622 interfaces with the communication bus 604 and the display 620. The display adapter also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving, by a client computing machine, a token comprising a first applet, a first symmetric key set associated with the first applet and a card identification number of the token;
authenticating, by the client computing machine, with the first applet on the token using the first symmetric key set to establish access to the first applet;
generating, by the client computing machine, a second symmetric key set based on a private cryptographic key and the card identification number of the token in response to authenticating with the first applet;
associating, by the client computing machine, the second symmetric key set with the first applet; and
severing, by the client computing machine, the association between the first symmetric key set with the first applet.

2. The method of claim 1, further comprising:
authenticating with the first applet on the token using the second symmetric key set; and
embedding a second applet on the token in response to authenticating with the first applet.

3. The method of claim 2, further comprising:
generating a third symmetric key set based on a second private cryptographic key;
storing the third symmetric key set on the token;
associating the third symmetric key set with the second applet; and
forwarding, by the client computing machine, the token to a second computing machine.

4. The method of claim 3, further comprising:
generating, by the second computing machine, a fourth symmetric key set based on a third private cryptographic key;
storing the fourth symmetric key set on the token;
associating the fourth symmetric key set with the second applet; and
severing, by the second computing machine, the association between the third symmetric key set with the second applet.

5. A system comprising:
an interface to receive a token comprising a first applet, a first symmetric key set that is associated with the first applet and a card identification number of the token;
a processor coupled to the interface and configured to
authenticate with the first applet on the token using the first symmetric key set to establish access to the first applet;
generate a second symmetric key set based on a private cryptographic key and the card identification number of the token in response to authenticating with the first applet;
associate the second symmetric key set with the first applet; and
severe the association between the first symmetric key set with the first applet.

6. The system of claim 5 wherein the processor is further configured to:
authenticate with the first applet on the token using the second symmetric key set; and
embed a second applet on the token in response to authenticating with the first applet.

7. The system of claim 6, wherein the processor is further configured to:
generate a third symmetric key set based on a second private cryptographic key;
store the third symmetric key set on the token;
associate the third symmetric key set with the second applet; and
forward the token to a computing machine.

8. A method comprising:
storing, by a token, a first applet, a first symmetric key set associated with the first applet, and a card identification number of the token;
authenticating a client computing machine by the first applet on the token based on the first symmetric key set;
receiving, by the token, a second symmetric key set from the client computing machine in response to authenticating the client computing machine, wherein the second symmetric key is based on a private cryptographic key and the card identification number of the token;
associating, by the token, the second symmetric key set with the first applet; and
executing, by the token, a command to sever the association between the first symmetric key set with the first applet.

9. The method of claim 8, the method further comprising:
authenticating, by the first applet on the token, the client computing machine using the second symmetric key set; and
storing a second applet by the token in response to authenticating the client computing machine.

10. The method of claim 9, the method further comprising:
receiving a third symmetric key set based on a second private cryptographic key;
storing the third symmetric key set by the token;
associating the third symmetric key set with the second applet.

11. The method of claim 10, the method further comprising:
receiving a fourth symmetric key set based on a third private cryptographic key;
storing the fourth symmetric key set by the token;
associating the fourth key set with the second applet; and
executing, by the token, a command to sever the association between the third symmetric key set with the second applet.

12. A non-transitory computer readable storage medium including instructions that, when executed by a processing system, cause the processing system to perform a method comprising:
receiving a token comprising a first applet, a first symmetric key set that is associated with the first applet and a card identification number of the token;
generating, by the processing system, a second symmetric key set based on a private cryptographic key and the card identification number of the token in response to authenticating with the first applet;
associating the second symmetric key set with the first applet; and
severing the association between the first symmetric key set with the first applet.

13. The non-transitory computer readable storage medium of claim 12, further comprising:
authenticating with the first applet on the token using the second symmetric key set; and
embedding a second applet on the token in response to authenticating with the first applet.

14. The non-transitory computer readable storage medium of claim 13, further comprising:
generating a third symmetric key set based on a second private cryptographic key;
storing the third symmetric key set on the token;
associating the third symmetric key set with the second applet; and
forwarding, by the processing system, the token to a computing machine, wherein the computing machine generates a fourth symmetric key set based on a third private cryptographic key, stores the fourth symmetric key set on the token, associates the fourth symmetric key set with the second applet, and severs the association between the third symmetric key set with the second applet.

* * * * *